Inventor
Horst HERMANN
BY
ATTORNEYS

Horst HERMANN

July 27, 1965

H. HERMANN 3,196,718

REMOTE-CONTROLLED MACHINE TOOL FOR HOT
CHAMBERS OF NUCLEAR ENERGY PLANTS

Filed June 11, 1962

INVENTOR
Horst HERMANN
BY

ATTORNEYS

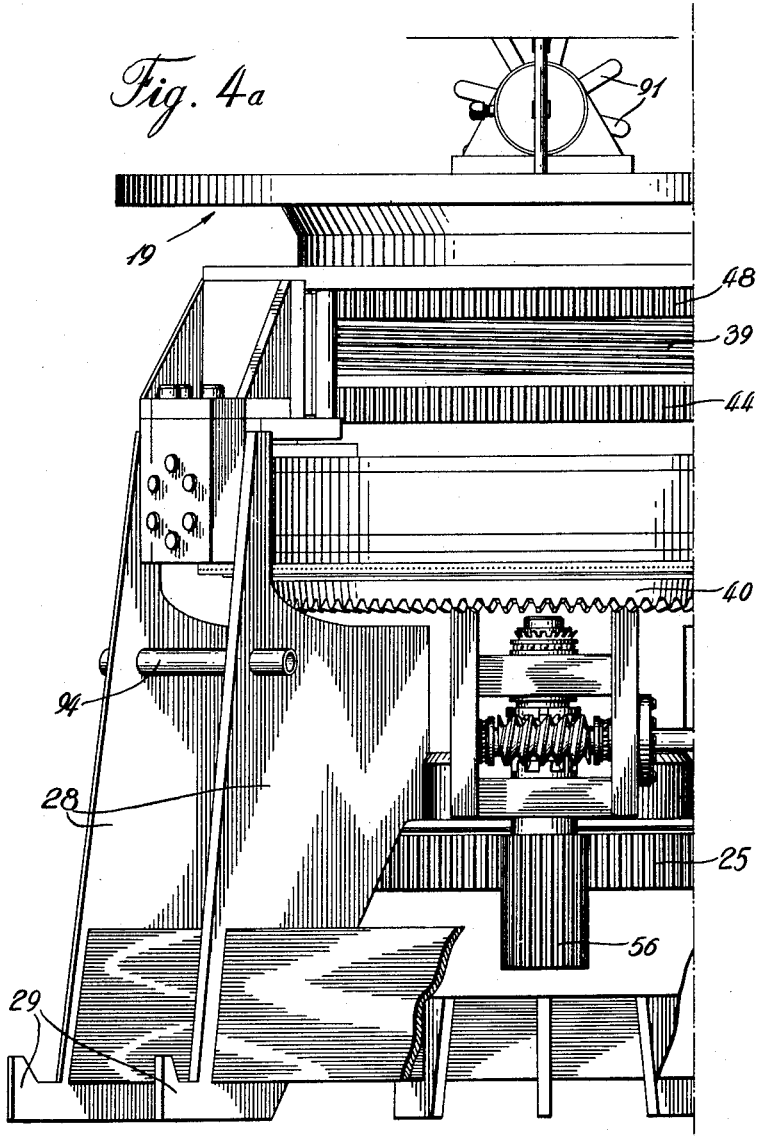

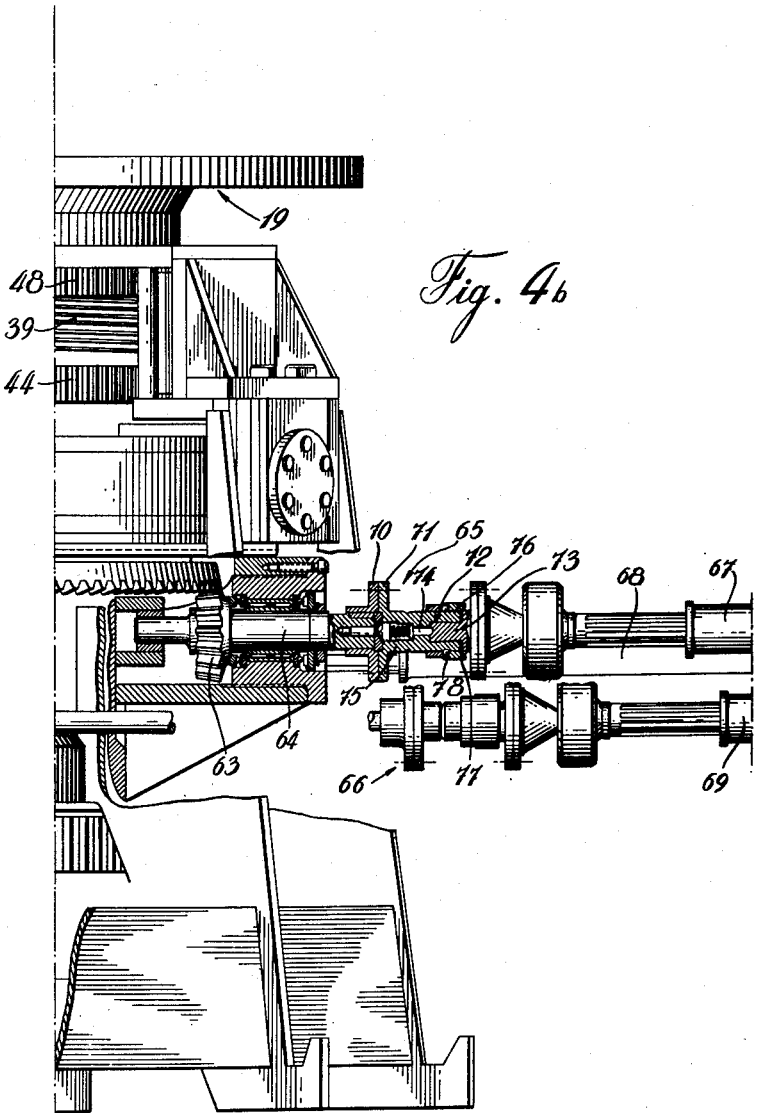

United States Patent Office 3,196,718
Patented July 27, 1965

3,196,718
REMOTE-CONTROLLED MACHINE TOOL FOR HOT CHAMBERS OF NUCLEAR ENERGY PLANTS
Horst Hermann, Leopoldsburg, Belgium, assignor to European Atomic Energy Community-Euratom, Brussels, Belgium
Filed June 11, 1962, Ser. No. 201,639
8 Claims. (Cl. 82—20)

This invention has been made within the framework of the convention between Euraton and the Belgian Nuclear Research Center (C.E.N.) through cooperative use of the experimental reactor BR-2 and its appertaining installations.

The invention has for its object to provide a machine tool with which rotationally symmetrical radioactive elements, such as for example nuclear fuel rod, or material testing tubes, can be worked by remote control with removal of chips or without chip formation. In particular it is intended to cut off the heads and ends of the mentioned operative elements or to cut open their welded seams by means of turning tools, so as to provide access to the radioactive or activated materials. In the present case it is intended especially to work upon material testing tubes, so-called test carriers, in a hot cell with a manipulator, the driving and control elements of the machine being disposed outside the cell.

The machine tool must therefore make it possible to pick up and securely clamp large workpiece lengths with economy of space. It must in addition be characterized by an easily manipulatable tool, that is one which can be easily displaced, since for various reasons (for example the space and observation relationships) it is not possible to swing or otherwise move in a complicated fashion the test carriers which are several meters long. In the present case the machine must be adapted to work in a standing position and in a suspended position. The machine must also be adapted to pick up any waste material resulting from the operation.

All the movements necessary for operating on the workpiece, which are supplied to the machine mechanically from outside the cell in the form of simple rotary movements, must be transformed within the machine into the required types of movements in the simplest possible manner and by strictly mechanical means. In particular it is necessary to provide for feed of the tool in axial and radial direction, for tightening of the workpiece clamping devices and for rotation of the workpiece or of the tool. In the case at hand an arrangement has been selected in which the workpiece is fixed and the tool rotates.

The machine tool according to the invention fulfils to advantage the above mentioned requirements. It presents the basic conception of a cylindrical body open on both sides, of the type known in connection with conventional machine tools for chipless working of pipelines; this cylindrical body acts at the same time as a base for the machine and as a chuck for the workpiece clamping members or teeth disposed internally thereof. Peripherally about the base there is located a drive cylinder which carries the tool table and the tool support and there is provided on the base and table the conventional displacing mechanism consisting of pine and star wheel for producing the radial feed of the tool. The machine equipped in this fashion is characterized, in accordance with the invention, by a controllable planetary drive between the tool table and the driving cylinder for obtaining axial feed of the tool, with one drive shaft for each of the drive cylinders, the planet cage and the clamping teeth, the three shafts being bundled together and disposed on the same side of the machine, all the parts being mounted on the cylindrical body in such a way that the machine can operate either in standing or in suspended position and eventually freely swinging with and secured to the workpiece.

The machine base functions throughout its length as a tightening chuck for the clamping teeth, which gives the machine a fast hold on the workpiece. The planetary drive and the drive cylinder effect the required movements of the tool with suitable sensitivity. Their bearings are oversized so that they can run without lubrication. The parallel bundled arrangement of the drive shafts simplifies to a great extent the coupling and uncoupling of the machine from its drive station by remote control as well as the swinging and turning of the machine.

To give an idea of the operative possibilities of the machine the following data for one particular embodiment may be cited:

Speed of revolution of the tool _____ 150 r.p.m.
Axial and radial feed _____ 0.2 mm.
Largest chip cross-section _____ 8 mm$^2$.
Clamping clearance _____ 10–215 mm.
Operative length without unclamping ____ 43 mm.

An embodiment of the invention is illustrated schematically in the accompanying drawing in which:

FIG. 4 (a, b) is a side elevation of the machine tool in a position swung by 90° with respect to the position shown in FIG. 3.

Figure 1:
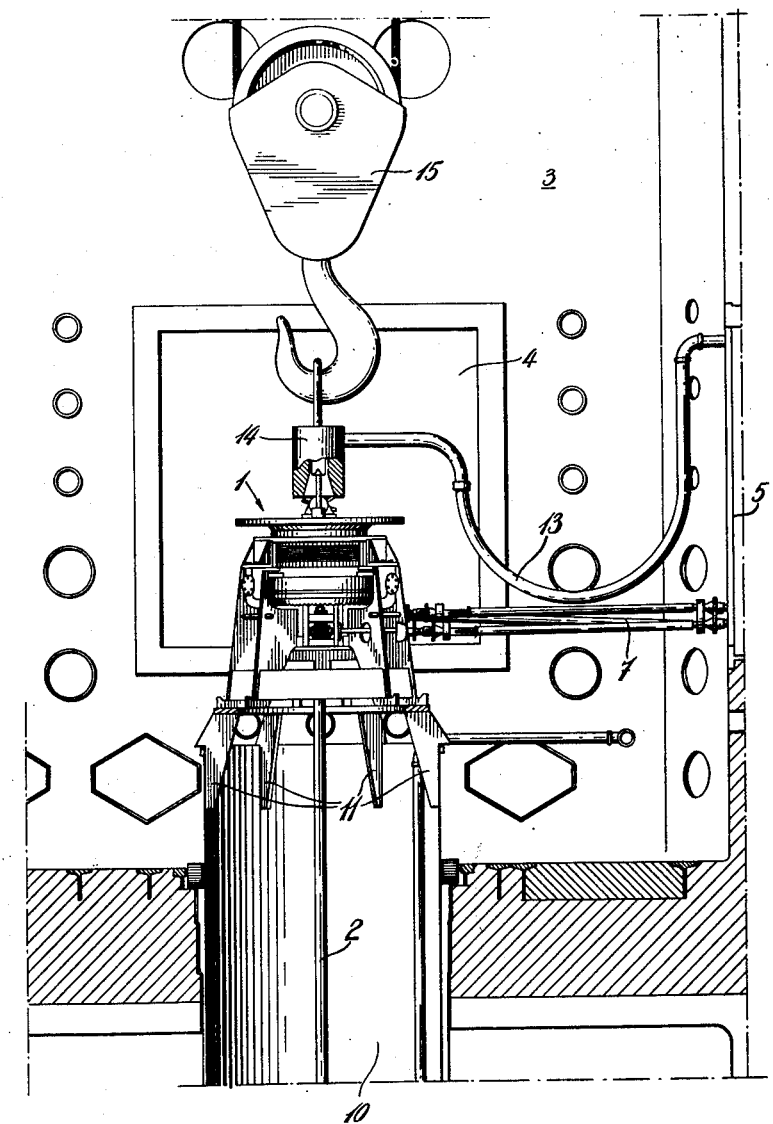
FIGURES 1 and 2 are vertical side elevations of the machine tool respectively in standing and in suspended position in a hot cell which is shown in section.
Figure 2:
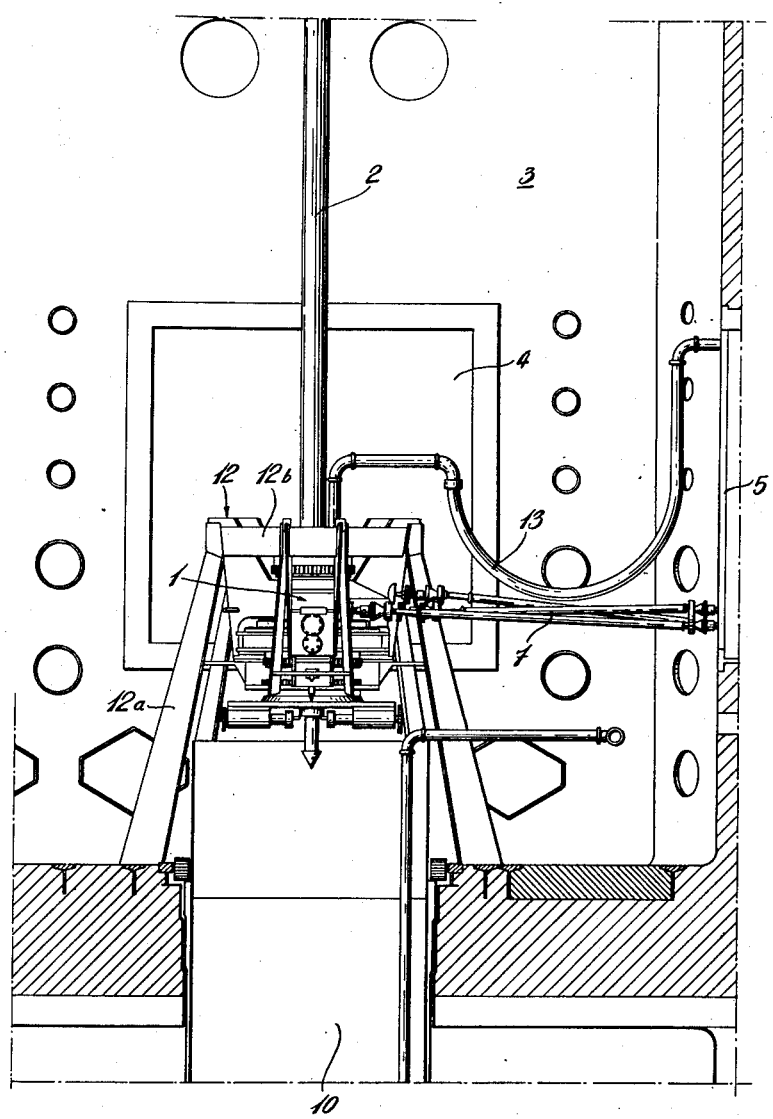

In FIGURES 1 and 2 numeral 1 designates the machine tool, 2 the test carrier (a tube), 3 the back wall of the hot cell provided with a window 4, another window 5 being located in the right-hand sectioned wall 6 of the cell, 7 the transmission shafts of the machine tool. The floor of the hot cell has built therein a well 10 which leads to the basement of the cell. As clearly shown in FIG. 1, when operating with a standing machine tool the carrier tube extends into the chamber through the well. The weight of the machine tool rests directly on the collar of the well, the machine itself being supported on a frame 11 mounted on the well. In the case of FIG. 2 the machine is hung in a long-legged support 12 consisting of legs 12a and of a suspension ring 12b at the upper ends of the legs.

In both FIGURES 1 and 2 numeral 13 designates a pipeline for the rinsing fluid required during the turning operation. Element 14 in FIG. 1 is the associated spray head which hangs from a crane hook 15. The crane hook illustrates by comparison the size of the machine tool which is about 75 cm. in height and has a table diameter of about 70 cm.

Figure 3A:
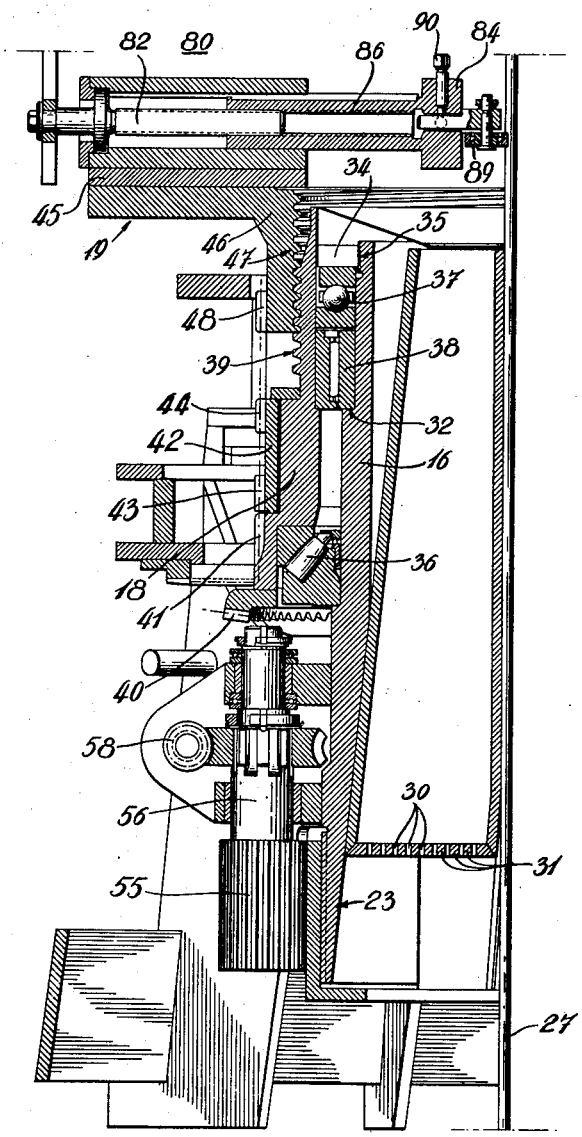
FIG. 3 (a, b) is a longitudinal section of the machine tool.
Figure 3B:
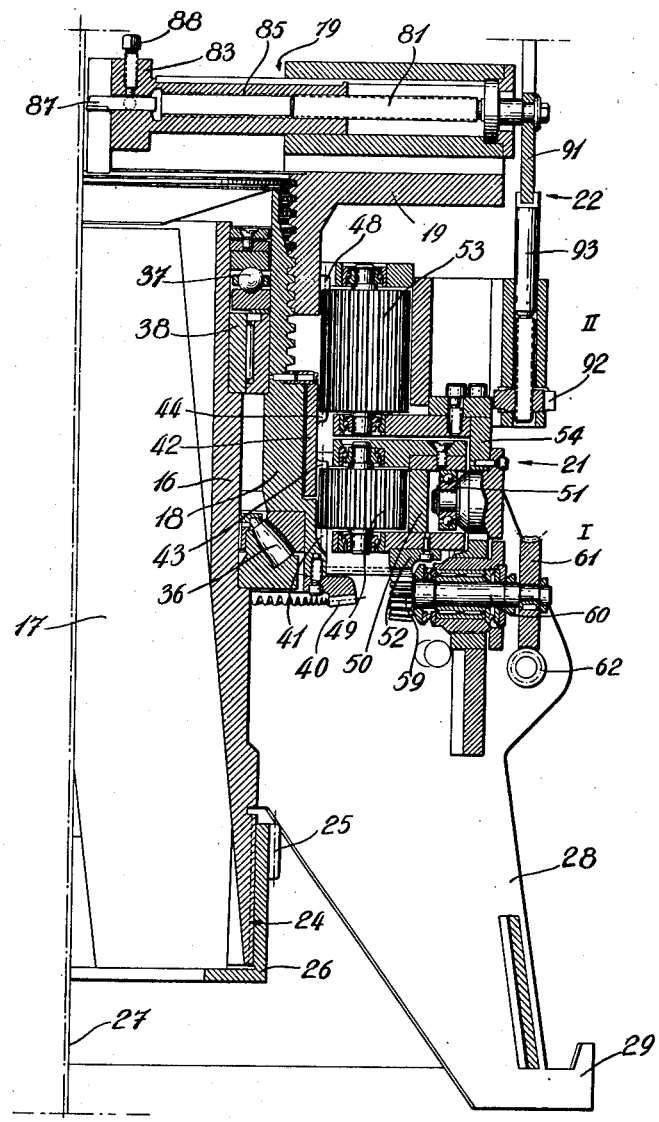

The characteristic constructional elements of the machine tool will now be described with reference to FIG. 3. Known elements, which are new, however, in the present connection, are the cylindrical body 16 open on both sides and serving both as machine base and as a chuck for the workpiece clamping members 17 disposed internally thereof, the drive cylinder 18 arranged peripherally about the base and carrying the tool table 19—displaceable relative thereto in the axial direction of the base—the tool supports 79 and 80, and the conventional displacing mechanism 22 for producing radial feed of the tool, the said mechanism being secured partly on the base and partly on the table. In accordance with the invention the machine is characterized by a controllable planetary drive 21 between the tool table and the drive cylinder for obtaining axial feed of the tool, with one drive shaft 67, 68 and 69 (FIG. 4) for each of the drive cylinder 18, the planetary cage or housing 50 and the clamping teeth 17, the three shafts being bundled together and connected to the machine on the same side, all the parts being mounted on the cylindrical body in such a way that the machine can operate both in standing and in suspended position.

In greater detail the cylindrical body 16, opened at both ends (also referred to as the machine body), has internal conical slide surfaces 23 with axial guide grooves for the workpiece clamping members 17, and externally at the bottom a screw-thread 24 on which is screwed a cap 26 which is open and is provided with a spur gear 25 and which functions as longitudinal adjusting member for the clamping members. Tube 27 is the test carrier. The machine body is built as a (welded) unit with a standing and hanging frame 28 having anchor-shaped feet 29.

The workpiece clamping members 17 consist of three cylinder-shaped hollow clamping teeth which together fill the whole clear cross-section of the base and which have internally thereof a perforated transverse partition 31 provided with borings 30. Thus the clamping members are adapted to catch the waste but allow passage of the above mentioned rinsing fluid.

The machine body is externally provided with shoulders 32 and 33 and with a stop ring 34 provided with a screw-thread 35, between which is mounted the drive cylinder 18 so as to be fixed in the axial direction. The drive cylinder is borne by a conical roller bearing 36 at the lower end and by a ball bearing 37 at the upper end. Bearing 36 is operative in the standing position of the machine tool and bearing 37 is operative in the suspended position. Between the above mentioned bearings there is disposed a transverse pin bearing 38 which serves to space and center the drive cylinder with respect to the machine body.

Externally at the table side the drive cylinder is provided with a buttress thread 39 on which is loosely mounted the tool table 19. At the lower end the drive cylinder carries a first spur gear 40 for its own drive, and a second spur gear 41 for coupling to the planetary drive 21; at an intermediate portion of its periphery the cylinder carries loosely a sun gear 42 of the planetary drive, which has two spur gears 43 and 44.

The tool table is screwed, as mentioned above, on the top of the cylinder. The table consists of an annular plate 45 with a flange-like neck piece 46. The neck piece 46 has internally a buttress-thread 47 for engagement with the drive cylinder and externally a spur gear 48 for coupling with the planetary drive.

The planet pinions of the planetary drive are arranged in two groups I and II of three pieces each, in two planes one above the other within the vertical extent of the sun gear 42, the lower group I, one pinion of which is visible at 49, meshing with the second spur gear 41 of the drive cylinder and with the lower spur gear 43 of the sun gear 42. The planet pinions of group I are borne in a cage 50 which is rotatably mounted on a ball bearing 51 and surrounds the machine base transversely to the base axis, and which is provided with a spur gear 52. The planetary pinions of group II in the upper plane, one of which is visible at 53, mesh with the upper spur gear 44 of the sun gear and with the spur gear 48 of the table. This group is fixedly mounted on a frame member 54 of the machine base. The tooth number of the planet pinions of each group corresponds to the number of teeth overstepping the tooth number 97. In the present case each group consists of three pinions displaced 120° from each other over the periphery of the machine.

The spur gear 41 of the drive cylinder which meshes with the planet pinions 49 of group I has the same number of teeth as the spur gear 48 of the table, namely 97 teeth, while the identical spur gears 43 and 44 of the sun gear have a slightly different number of teeth, namely 100. All the spur gears have the same modulus, except for the correction of those of the sun gear.

The spur gear 25 of the cap 26 for the clamping teeth, the spur gear 52 of the annular cage of the planetary drive and the spur gear 40 of the drive cylinder 18 are each connected with coupling drives. In the case of the cap 26 the coupling drive consists of a pinion 55 with a shaft 56, a worm gear 57 and a worm 58; the coupling drive for the planetary drive consists of a bevel pinion 59 with a shaft 60, a worm gear 61 and a worm 62; and the coupling drive for the drive cylinder consists of a bevel pinion 63 (FIG. 4) with a shaft 64.

The shaft 64 and the worms 58 and 62 are parallel to each other and extend on the same side of the standing and hanging frame of the machine, and are coupled as shown in FIG. 4 by couplings 65 and 66 (the third coupling is not visible) to three drive shafts 67, 68 and 69. The drive shafts are thus enabled to pass as a bundle out of an opening in the cell wall and can easily be connected by means of the manipulator of the cell.

As shown in FIG. 4 each coupling consists of two flanged pieces 70 and 71 screwed together, one being secured to the corresponding shaft or worm and the other constituting the actual coupling member. The latter comprises a swallow-tail recess which receives a complementary part 73 of the corresponding drive shaft. In the interior there is provided a ram 74 with a compression spring 75 for centering the coupling connection. An external ring 76 secures the connection by engagement of balls 78 in corresponding recesses, the said balls being biassed by leaf springs 78. The power transmission shafts illustrated are of the splined type.

The tool table has mounted thereon two identically built diametrically opposite supports 79 and 80 with spindles 81 and 82, and heads 83 and 84, the supports having internal screw-threads 85 and 86 respectively. Support 79 holds the working tool, a gouge 87 which is fastened with a set screw 88, while the support 80 carries a member for supporting the workpiece, namely a ball bearing 89 formed in its outer circumferential surface with a notch for receiving the workpiece, the member being held by means of an adjusting or clamping screw 90.

The displacing mechanism for the tool support 79 consists of a star wheel 91 secured to spindle 81 and of a strike-pin 93 which moves up and down through the agency of a control member 92. At each rotation of the tool table the pin turns the star wheel 91 by one tooth so that the gouge is moved towards or away from the center of the table depending on the direction of rotation of the table.

The displacement of the tool in the axial direction of the machine, that is up and down, is effected by the planetary drive. For the sake of simplicity the operation will be explained by assuming that the drive cylinder is at rest, although the displacement is of course possible and does take place when the cylinder rotates.

When the annular cage 50 of the planet pinion group I undergoes one revolution, the planet pinion 49 covers the 97 teeth of the spur gear 41 of the drive cylinder and 97 of the 100 teeth of the spur gear 43 of the sun gear. As a result, after one full rotation of the annular cage the sun gear is in advance of the drive cylinder by 3 teeth. Consequently the planet pinion 53, which is engaged with the upper spur gear 44 (also having 100 teeth), advances the tool table—whose spur gear 48 has only 97 teeth—by 3 teeth with respect to the drive cylinder. Since the drive cylinder and the table are connected by buttress threads, the table moves upwardly with respect to the drive cylinder (clockwise rotation). The result is relative downward movement of the gouge, which is equivalent to the required axial feed. The planetary drive adds or subtracts, according to the direction of rotation, to or from the rotational speed of the drive cylinder the speed component resulting from the difference in the number of teeth. When the annular housing is at rest no axial movement takes place.

The coupling of the splined shafts to the machine tool, which is put in position by means of a crane, is effected by a manipulator of the hot cell. To enable inversion of the machine to hanging position, the machine frame has anchored thereto a bolt 94 clearly shown in FIG. 4.

By using known adaptations of the workpiece, of the clamping teeth and of the tool support, it is also possible to handle workpieces the diameter of which is larger than the maximum clearance between the clamping teeth. Furthermore, a welding electrode may be secured in the tool support instead of the gouge, to form welded connections between parts, for example between a tube and a cap, by melting of superposed parts.

I claim:

1. In a remotely controlled machine tool for use in a hot chamber of an atomic power plant, the combination comprising:
    (a) a stationary machine base;
    (b) workpiece clamping means within said base, adapted to hold and stabilize a workpiece to be machined;
    (c) rotatable means engageable with said clamping means to cause clamping operation thereof;
    (d) a rotatable, axially stationary, driving cylinder, mounted around said base and coaxial therewith;
    (e) a tool table, including an adjustable machine tool adapted to engage the workpiece held by said clamping means; said tool table being threadedly mounted on said driving cylinder whereby relative rotation of said cylinder and table causes relative axial displacement thereof;
    (f) an epicyclic transmission system interconnecting said driving cylinder and said tool table to cause relative rotation thereof;
    (g) a satellite cage, included in said epicyclic system, rotatable about said driving cylinder to cause relative rotation and axial displacement of said driving cylinder and table, independently of the rotation of said driving cylinder, and
    (h) power means for driving said rotatable means engageable with said clamping means, said driving cylinder and said rotatable cage.

2. A combination as claimed in claim 1, wherein said power means includes an independent drive shaft operatively coupled to each of said rotatable means, driving cylinder and rotatable cage; said shaft extending side-by-side in bunched relationship and traversing a wall of said hot chamber whereby to be remotely operated.

3. In a remotely controlled machine tool for use in a hot chamber of an atomic power plant, the combination comprising:
    (a) a stationary machine base;
    (b) workpiece clamping means within said base, adapted to hold and stabilize a workpiece to be machined;
    (c) rotatable means engageable with said clamping means to cause clamping operation thereof;
    (d) a rotatable, axially stationary, driving cylinder mounted around said base and coaxial therewith;
    (e) a tool table, including adjustable machine tool adapted to engage the workpiece held by said clamping means; said tool table being threadedly mounted on said driving cylinder whereby relative rotation of said cylinder and table causes relative axial displacement thereof;
    (f) a transmission toothed ring on each of said driving cylinder and said table;
    (g) a sun gear mounted for free rotation around said driving cylinder between said transmission toothed rings;
    (h) a first set of planet gears rotatable about stationary axes and meshing with said sun gear and the toothed ring of said table;
    (i) a satellite cage mounted to rotate around said driving cylinder;
    (j) a second set of planet gears mounted for rotation in said satellite cage and around axes stationary in regard to said satellite cage and meshing with said sun gear and the toothed ring of said driving cylinder; the number of teeth on said toothed rings being equal and the number of teeth of said sun gear being greater than those of said toothed rings;
    (k) power means for driving said rotatable means engageable with said clamping means, said driving cylinder and said rotatable cage.

4. A combination as claimed in claim 3, wherein said power means includes independent drive shaft operatively coupled to each of said rotatable means, driving cylinder and rotatable cage; said shaft extending side-by-side in bunched relationship and traversing a wall of said hot chamber whereby to be remotely operated.

5. In a remotely controlled machine tool for use in a hot chamber of an atomic power plant, the combination comprising:
    (a) a stationary cylindrical vertical machine base having a conical bore through which a workpiece to be machined is adapted to vertically extend;
    (b) clamping members mounted in said base, having conical surfaces slidable on said conical bore for movement toward and away from said workpiece to respectively clamp and release the said workpiece;
    (c) means, operable upon rotation thereof, to so move said clamping members;
    (d) a rotatable, axially stationary, driving cylinder mounted around said base and coaxial therewith;
    (e) a substantially horizontal tool table, including a central radially displaceable machine tool adapted to engage the workpiece held by said clamping members, said table having a central cylindrical inwardly threaded neck mounted on a threaded upper end of said driving cylinder whereby relative rotation of said cylinder and table causes relative axial displacement thereof;
    (f) a transmission toothed ring on each of said driving cylinder and said neck, outwardly thereof;
    (g) a sun gear mounted for free rotation around said driving cylinder between said transmission toothed rings;
    (h) a first set of planet gears rotatable about stationary axes and meshing with said sun gear and the toothed ring of said neck;
    (i) a satellite cage mounted to rotate around said driving cylinder;
    (j) a second set of planet gears mounted for rotation in said satellite cage and meshing with said sun gear and the toothed ring of the said driving cylinder;
    (k) power means for driving said rotatable means engageable with said clamping means, said driving cylinder and said rotatable cage.

6. A combination as claimed in claim 5, wherein said power means includes independent drive shaft operatively coupled to each of said rotatable means, driving cylinder and rotatable cage; said shafts extending side-by-side in bunched relationship and traversing a wall of said hot chamber whereby to be remotely operated.

7. A combination as claimed in claim 6, wherein said rotatable means to move said clamping members comprises:
    a cap screw-threaded at the lower end of said base and having a web engageable with the lower end of said clamping members and a toothed ring on the outer surface thereof;
    a gear meshing with said toothed ring and secured to a worm shaft;
    a worm gear meshing with said worm shaft and secured to said independent shaft for driving said rotatable means.

8. A combination as claimed in claim 5, wherein said machine tool is radially displaced by a mechanism including a star wheel having radially projecting spokes and said stationary machine base is provided with an upstanding striking pin adapted to strike one said spokes at each revolution of said tool table whereby to cause displacement of the tool relative to the workpiece.

References Cited by the Examiner

UNITED STATES PATENTS

| | | | |
|---|---|---|---|
| 1,526,950 | 2/25 | Barttey | 82—4 |
| 1,707,478 | 4/29 | Hyde | 82—4 |
| 2,112,396 | 3/38 | Corrigan | 82—20 |
| 2,427,322 | 9/47 | Darner | 82—20 |
| 3,078,749 | 2/63 | Maxner | 82—4 |

FOREIGN PATENTS

| | | |
|---|---|---|
| 159,206 | 2/21 | Great Britain. |
| 245,185 | 12/25 | Great Britain. |

WILLIAM W. DYER, Jr., *Primary Examiner.*
ANDREW R. JUHASZ, *Examiner.*